Aug. 31, 1954     J. R. JACKSON     2,687,927
BEARING ASSEMBLY FOR RAILWAY CAR AXLE JOURNALS
Filed Aug. 14, 1953     3 Sheets-Sheet 1
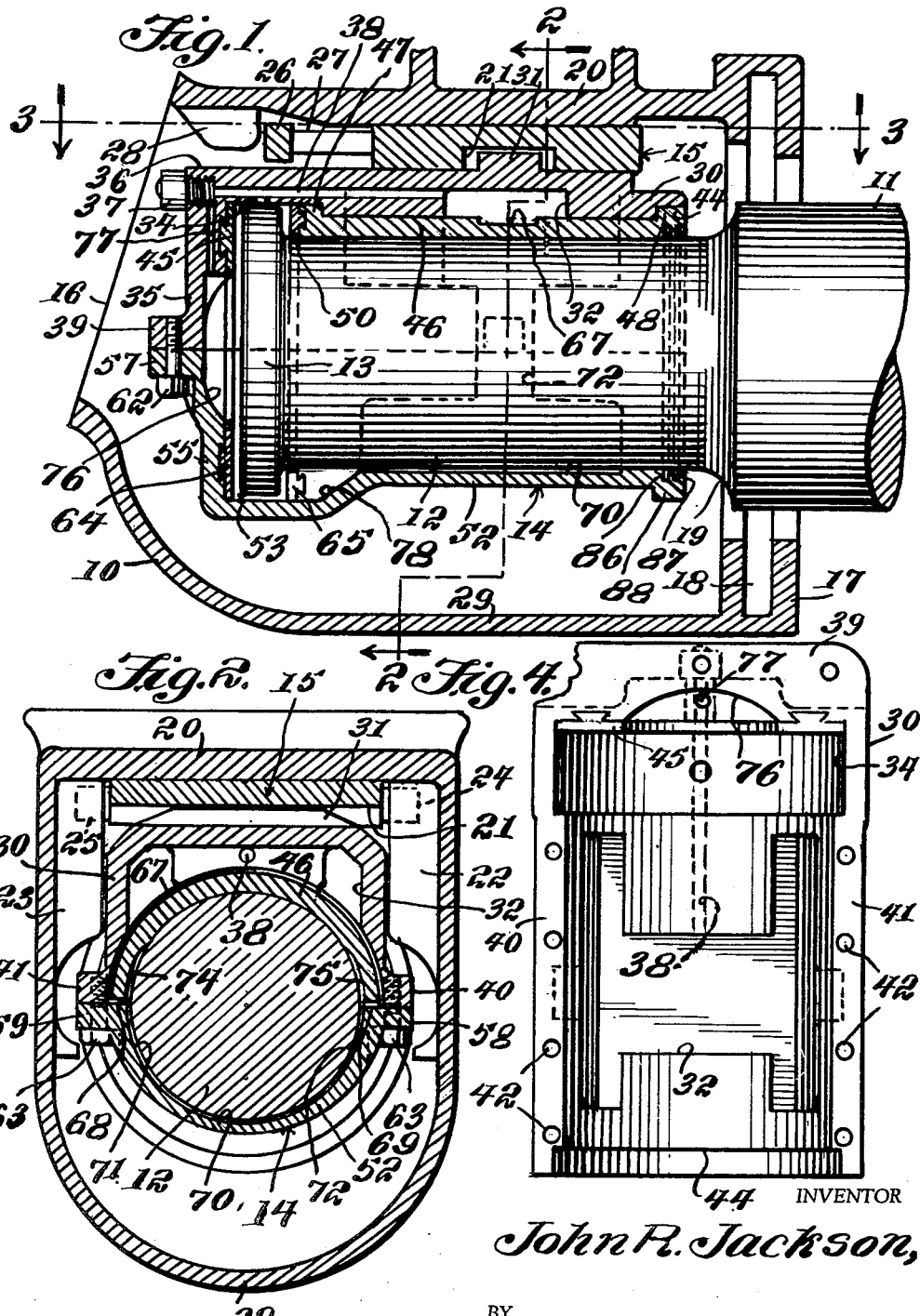
INVENTOR
John R. Jackson,
BY
McMorrow, Berman + Davidson
ATTORNEYS

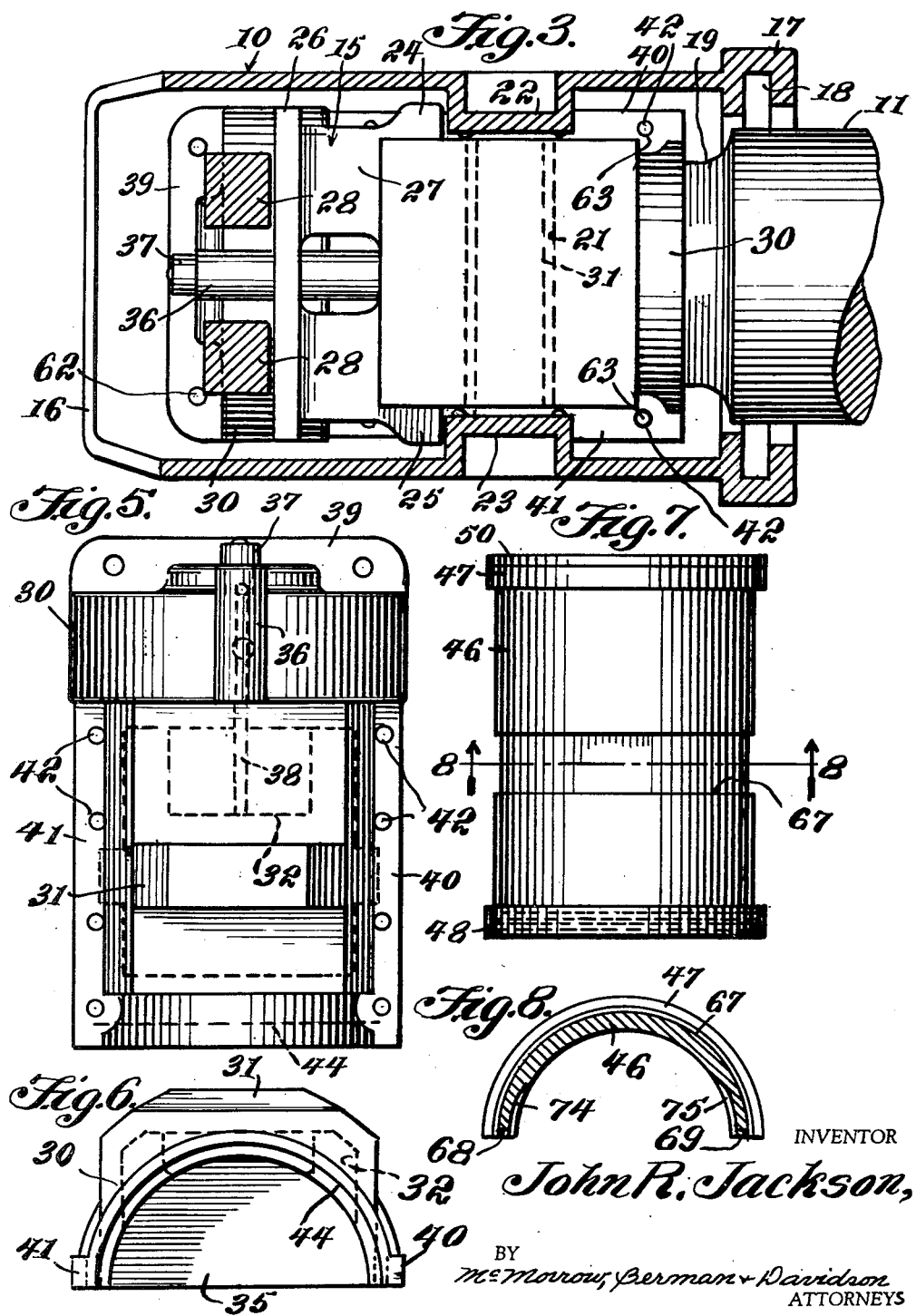

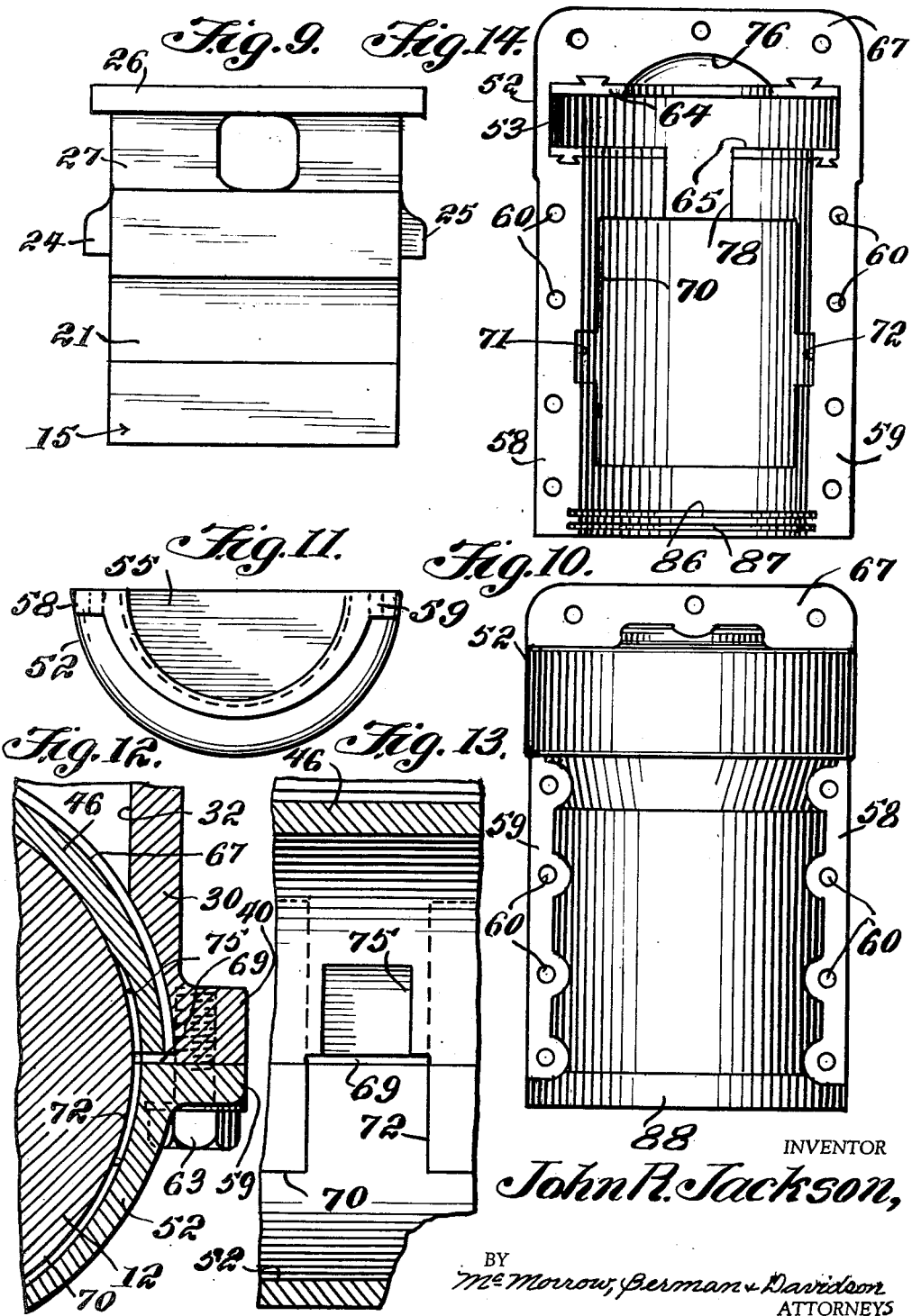

Patented Aug. 31, 1954

2,687,927

UNITED STATES PATENT OFFICE 2,687,927

BEARING ASSEMBLY FOR RAILWAY CAR AXLE JOURNALS

John R. Jackson, Williamsburg, Va.

Application August 14, 1953, Serial No. 374,235

3 Claims. (Cl. 308—86)

This invention relates to axle bearings for railway cars and more particularly to a bearing assembly receiving an axle journal and mounted in an associated journal box for supporting the journal for rotation in the journal box.

It is among the objects of the invention to provide an improved bearing assembly which receives and completely surrounds the axle journal and is received together with the journal in a journal box of known construction; which cannot move away from the associated journal when the axle carried wheels are subjected to braking action or the related car is subjected to shock during car switching operations or when slack is being taken up in a train; which provides a limited freedom of longitudinal movement of the axle relative to the bearing assembly and the associated journal box; which covers the outer end of the axle journal and eliminates the necessity for a cover on the open, outer end of the journal box; which eliminates the necessity for a seal between the inner end of the journal box and the inner end of the journal and eliminates the use of waste in the journal box to carry lubricant to the journal; which includes a lubricant reservoir and lubricant feed means for carrying lubricant from the reservoir to the journal; which is installed in the journal box in substantially the same manner as the journal bearings or brasses at present in use and is restricted in its movement relative to the journal box in a direction longitudinally of the associated axle; which utilizes only the outer end collar of the journal to limit longitudinal movements of the axle relative to the journal box; which fully protects the bearing surface of the journal at all times including such times as the axle is in storage or transportation; and which is simple and durable in construction, economical to manufacture, and efficient and dependable in use.

Other objects and advantages will become apparent from a consideration of the following description and the appended claims in conjunction with the accompanying drawings wherein:

Figure 1 is a longitudinal medial cross sectional view through a journal box and a bearing assembly illustrative of the invention showing in side elevation an axle journal in the bearing assembly;

Figure 2 is a transverse cross sectional view on the line 2—2 of Figure 1;

Figure 3 is a longitudinal cross sectional view on the line 3—3 of Figure 1;

Figure 4 is a bottom plan view of a top member constituting a portion of the bearing assembly;

Figure 5 is a top plan view of the top member illustrated in bottom plan view in Figure 4;

Figure 6 is an end elevational view of the top member;

Figure 7 is a top plan view of a semicylindrical half bushing insert for the top member of the bearing assembly;

Figure 8 is a transverse cross sectional view on the line 8—8 of Figure 7;

Figure 9 is a bottom plan view of a mounting wedge disposed between the top member illustrated in Figures 4 and 5 and the top sides of the journal box illustrated in Figure 1;

Figure 10 is a bottom plan view of a half bushing of semicylindrical shape disposed below and secured to the associated top member in the bearing assembly, as illustrated in Figure 1;

Figure 11 is an end elevational view of the half bushing illustrated in Figure 10;

Figure 12 is a fragmentary cross sectional view on an enlarged scale taken in the plane of the section of Figure 2 and showing structural details of the lubrication features of the bearing assembly;

Figure 13 is a fragmentary cross sectional view on an enlarged scale taken in the plane of the section of Figure 1 showing the lubrication feature details illustrated in Figure 12; and Figure 14 is a top plan view of a somewhat modified form of bottom half bearing.

With continued reference to the drawings, the bearing assembly comprises, in general, a journal box 10 of well known construction secured to one end of one of the side bars of a railway car truck in a manner well known to the art, a wheel carrying axle 11 having terminal journals of cylindrical shape and reduced diameter, as indicated at 12, the journal being provided at its outer end with an annular collar or flange 13 of a diameter greater than the diameter of the journal, a longitudinally split bearing assembly 14 receiving the journal and completely enclosing the journal and the journal end collar and a mounting wedge key 15 disposed between the split bearing assembly and the inner surface of the top wall of the journal box.

The journal box 10 has an open outer end 16 and a flange 17 at its inner end surrounding the end of the axle adjacent the journal 12 and provided with an annular groove or cavity 18 opening to the adjacent surface of the axle, and the axle is provided with a fillet 19 at the adjoining ends of the axle and the journal.

In the axle bearing assemblies now in use and generally referred to as the standard bearing assemblies of the Association of American Railroads, the wedge key 15 is provided in its under surface with a groove of substantially trapezoidal cross sectional shape, a top bearing or brass is disposed between the journal and the wedge key and has its outer or upper surface shaped to conform to the shape of the under surface of the wedge key and the adjacent surfaces of the sides of the journal box and its under surface shaped to a substantially semicylindrical shape and extending around the upper portion of the journal. With this arrangement, a body of lubricant saturated waste is disposed in the bottom portion of the journal box to carry lubricant to the journal, a packing member is disposed in the groove 18 and bears against the surface of the axle within the groove to provide a seal at the inner end of the journal box, and a cover is hinged to the outer end of the journal box to cover the opening in this end of the box. The top bearing is somewhat shorter than the distance between the end collar 13 and the fillet 19 and limits longitudinal movements of the associated axle relative to the journal box when the inner side of the collar 13 or fillet 19 is brought into engagement with the corresponding end of the bearing, the journal box having internal ribs at respectively opposite sides of the journal and the top bearing having rib receiving notches therein to limit the longitudinal movements of the bearing relative to the journal box.

While this arrangement has been in use for a long time and is currently in extensive use, its operation is unsatisfactory in many ways, and particularly in that it is subject to rapid wear, poor lubrication, over-heating and waste grabbing occasioned by the movement of the journal relative to the associated top bearing or brass when the associated wheels are subjected to braking action, or the car is subjected to shock.

By providing a split bearing assembly receiving and completely enclosing the journal, as in the present invention, adequate lubrication is assured, eliminating the danger of rapid wear and overheating of the bearing, the presence of waste in the journal box is eliminated, so that waste cannot be drawn between the bearing surfaces of the journal and the brass, and the necessity for the seal around the inner end of the journal box and the movable cover on the outer end of the journal box is eliminated.

In the bearing assembly of the present invention, the wedge key 15 is modified to a flat condition, one flat surface of which contacts the flat inner surface of the top wall 20 of the journal box and the other flat surface of which is provided intermediate its length with a transversely extending recess 21. The journal box 10 is provided on the inner surfaces of its side walls, at respectively opposite sides of the journal 12, with ribs 22 and 23 disposed substantially perpendicular to the flat top wall 20 of the journal box, and the wedge key is provided intermediate its length with lugs 24 and 25 projecting one from each side thereof and engaging the sides of the ribs 22 and 23 nearest the outer or open side of the journal box to restrain the wedge key against movement inwardly of the journal box. At its outer end the wedge is provided with a transverse flange formation 26 joined to the main body of the wedge key by a portion 27 of reduced thickness and the outer edge of the flange formation 26 is engageable with a stop 28 depending from the inner surface of the top wall of the box at the outer end of the box to restrain the wedge key against movement outwardly of the journal box. The over-all length of the wedge key 15 is made less than the distance between stops 22, 23 and 28 on the journal box 10 to provide clearance for installation and to provide a limited, friction resisted longitudinal movement of the wedge key relative to the journal box top wall 20. It will be noted that the opening in the rear end of the journal box is materially larger than the associated axle and is of sufficient size for the passage of the axle journal with the split bearing assembly thereon through this end of the journal box, and that sufficient space is provided between the bearing assembly and the bottom wall 29 of the journal box, so that the journal box can be raised relative to the associated journal for the installation of the wedge key 15 between the top of the bearing assembly and the top wall 20 of the journal box.

The split bearing assembly 14 comprises a top bearing member 30 of elongated, rectangular shape in plan, having a flat top surface bearing against the flat bottom surface of the wedge key 15 and provided intermediate its length with a transversely extending rib or boss 31 received in the transversely extending recess 21 of the wedge key and having a width less than the width of the recess to limit movement of the top bearing member relative to the wedge key in a direction along the rotational axis of the journal, the limited relative movement provided for being resisted by friction between the top surface of the top bearing member and the bottom surface of the wedge key 15.

The top bearing member has an inner surface of substantially semicylindrical shape provided with an H-shaped recess 32 therein to provide a lubricant reservoir chamber. At its end adjacent the collar 13 of the journal 12, the top bearing member is provided with a circumferentially extending groove or recess 34 having a width greater than the width of the collar 13, and a radius of curvature slightly greater than the radius of curvature of the peripheral surface of the collar and is provided with an end wall 35 of semicircular shape at this same end thereof. At the end thereof having the end wall 35, the outer bearing member 30 is provided with an internally screw threaded, hollow boss 36 receiving a grease fitting 37 of well known construction, and a grease channel 38 leads from the inner end of the interior of the boss 36 into the reservoir chamber 32, so that the lubricant reservoir chamber can be maintained filled with lubricant through the grease fitting 37.

The end wall 35 of the top bearing member is provided at locations spaced apart along the straight edge thereof with a flange 39 and is provided along its side edges with outwardly extending flanges 40 and 41 having tapped holes extending therethrough at locations spaced apart therealong.

At its end remote from the end wall 35, the top bearing member 30 is provided with a circumferentially extending, internal recess 44 of rectangular cross sectional shape, and a lining 45 in the form of a flat strip of thrust bearing material of semicircular shape is disposed against the inner side of the end wall 35 and extends around the circumferential portion of the end wall.

A half bushing insert 46 of substantially semicylindrical shape is disposed within the top bearing member 30 and has a semicylindrical outer surface contacting the semicylindrical inner surface of the top bearing member and closing the open side of the lubricant reservoir recess 32 in the inner surface of the top bearing member. This bearing insert 46 has terminal flanges 47 and 48 extending around the respectively opposite ends thereof and projecting outwardly of the outer, semicylindrical surface of the insert, the flange 47 being received in the inner portion of the recess 34 in the top bearing member 30 and the flange 48 being received in the circumferentially extending recess 44 at the opposite end of the top bearing member, so that the insert is positively held against longitudinal movement relative to the top bearing member.

The insert has an inner surface of semicylindrical shape fitting closely around the upper half of the journal 12, and this insert is formed of a material of good antifriction bearing qualities and transmits the load of the corresponding portion of the associated car to the axle journal 12.

A flat band 50 of thrust bearing material is secured to and extends around the outer end of the bearing insert flange 47 and it will be noted that the distance between the adjacent surfaces of the thrust bearing material bands 45 and 50 is greater than the thickness of the collar 13 on the outer end of the journal 12, so that the journal has a limited freedom of movement longitudinally of the associated axle 11 relative to the journal box 10, this movement being limited by contact of the thrust bearing bands 45 and 50 with the adjacent end surfaces of the collar 13.

The bearing assembly further includes a bottom half bushing 52 having an inner surface of semicylindrical shape fitting around the lower half of the journal 12 and having at one end a circumferentially extending formation providing a groove or recess 53 corresponding in shape and size to the recess 34 in the top member 30 of the bearing assembly. This bottom half bushing has a substantially semicylindrical outer surface and has, at the end provided with the recess 53, an end wall 55 of semicircular shape covering the bottom half of the outer end of the journal 12. The end wall 55 is provided at locations spaced apart along the straight edge thereof with an apertured flange 57 and is provided along its side edges with outwardly projecting flanges 58 and 59 provided at spaced apart locations therealong with apertures 60 which register respectively with the apertures 42 in the corresponding flanges 40 and 41 of the top bearing member 30.

Suitable fasteners, such as the bolts 62, extend through the flange 57 on the end wall 55 and are threaded into the flange 39 on the end wall 35 to secure these end walls together along their straight edges in covering relationship to the outer end of the journal 12, and similar bolts 63 extend through the apertures 60 in the flanges 58 and 59 of the bottom half bushing 52 and are threaded into the corresponding tapped holes 42 in the flanges 40 and 41 of the bearing top member 30 to secure the side edges of the top member and the bottom member or bottom half bushing of the bearing assembly rigidly, but releasably together.

Semicircular bands 64 and 65 are disposed in the recess 53 of the bottom member 52 of the bearing with the band 64 disposed against the inner surface of the end wall 55 and complementing the band 45 to provide a thrust bearing band of complete circular shape, and a band 65 disposed against the inner side of the recess 53 and complementing the band 50 to also provide an inner thrust bearing band of complete circular shape.

A shallow groove 67 extends circumferentially of the outer surface of the bearing insert 46 intermediate the length of the insert and within the circumferentially extending portion of the reservoir chamber 32, and this groove opens at its ends to the interior of the bearing insert at the side edges of the insert through notches or openings 68 and 69, so that lubricant, such as soft grease, can flow from the chamber 32 around the end edges of the insert 46 to the bearing surface of the journal 12 to lubricate the bearing. The bottom half bushing 52 is provided in its inner surface with a shallow recess 70 having lateral extensions 70' and 71 of reduced width extending to the openings 68 and 69 respectively, at the opposite ends of the shallow groove 67, so that the lubricant can flow into and fill the recess 70. The journal will pick up the lubricant from the recess 70 and carry it around the internal bearing surface of the split bearing assembly, so that the entire surface of the bearing will be supplied with an adequate quantity of lubricant at all times.

As is particularly shown in Figures 2, 12 and 13, the half bushing insert 46 is provided in the inner surface thereof at locations medial of the length thereof with wedge shaped recesses 74 and 75 extending one from each longitudinal edge of the insert and tapering in depth in a direction away from the corresponding longitudinal edges of the insert. These recesses extend from the corresponding openings 68 and 69 for limited distances circumferentially of the inner surface of the insert 46 and constitute, in effect, terminal extensions of the lubricant carrying groove or recess 70 to assist in carrying lubricant from the openings 68 and 69 to the top of the bearing surface of the journal 12. The recess 74 or 75 toward which the top portion of the journal rotates, also facilitates the return of excess lubricant through the corresponding opening 68 or 69 to the lubricant chamber 32.

The bearing end walls 35 and 55 are concavely formed at their inner sides to provide an auxiliary lubricant chamber or reservoir 76 disposed within the inner edge of the thrust ring constituted by the semicircular bands 45 and 64 and opposite the outer end of the journal 12. A bypass channel 77 leads from the channel 38 near the inner end of the grease fitting 37 into the recess 76 and the bottom member 52 is provided centrally of its outer end with a formation 78 providing interiorly of this member a passage leading from the groove 70 into the portion of the member 52 receiving the bottom half of journal collar 13.

With this arrangement, when lubricant is supplied to the bearing assembly through the grease fitting 37, some of the lubricant will pass through the channel 77 and fill the chamber provided by the end wall recess 76 to provide a supply of lubricant for the journal collar 13 and associated thrust bands 45, 50, 64 and 65. When the journal is rotating or moving laterally in the bearing assembly the collar formation 13 will raise lubricant from the location of the passage provided in the bottom member formation 78 and forces lubricant upwardly through channel 77 in top member 30 from which the lubricant passes through channel 38 back to the main lubricant reservoir 32. This provides a complete circulation of lubricant through the bearing assembly whenever the journal is rotating in the bearing assembly and insures an adequate supply of lubricant to all wearing surfaces of the assembly.

Since it will be necessary to provide only a simple seal between the split bearing assembly and the journal at the end of the bearing assembly remote from the end walls 35 and 55, this can be easily accomplished by providing spaced apart, circumferentially extending grooves 86 and 87 in the terminal flange portion 48 of the bearing insert 46 and in the corresponding terminal flange 88 of the bottom half bushing 52 and placing suitable packing rings, one in each of these grooves, to bear against the bearing surface of the journal and prevent the lubricant from leaking out of the bearing at the inner end of the journal.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an axle journal having an annular collar on its outer end, a journal box receiving said journal and having a flat internal surface at its top side and internal ribs disposed at respectively opposite sides thereof and substantially perpendicular to said top side, and a flat bottom wedge key disposed in said journal box against the top side of the latter and having a recess in its bottom side, said wedge key engaging said ribs in a manner to provide a limited freedom of frictionally resisted movement of said wedge key relative to said journal box, a bearing assembly receiving said journal and comprising a top member having a flat top side disposed against the bottom side of said wedge key, a bottom surface of substantially semicylindrical shape extending around the top portion of said journal and recessed to provide a lubricant reservoir chamber therein, said top bearing portion having on its top side a boss loosely received in the recess in said wedge key to provide a limited freedom of frictionally resisted movement of said top bearing member relative to said wedge key and having a groove extending circumferentially of one end of the inner surface thereof receiving the corresponding portion of said journal collar and an end wall at said one end covering the upper half of the outer end of said journal, a half bushing insert of semicylindrical shape disposed in said top member against the inner surface of the latter and closing the open side of said reservoir chamber, said bushing insert receiving the upper half of said journal therein, a lower half bushing of semicylindrical shape receiving the lower half of said journal with its side edges juxtaposed relative to the corresponding side edges of said top bearing member and having a circumferentially extending groove at one end thereof receiving the corresponding portion of said journal collar and an end wall covering the lower half of the outer end of said journal, and means releasably securing said lower half bushing to said top bearing member.

2. In combination with a railway car journal box, a wedge key disposed in the top portion of said journal box for a limited freedom of frictionally resisted longitudinal movement relative to the journal box, and an axle journal disposed in said journal box and having an external annular flange surrounding its outer end, a split bearing assembly for journaling said journal in said journal box comprising a top member extending around the top half of said journal and bearing against the bottom side of said wedge key and engaged therewith for limited freedom of frictionally resisted longitudinal movement relative to said wedge key, said top member having therein a lubricant reservoir chamber opening to the bottom side of the member, a semicircular groove at one end thereof receiving the top half of the flange on the outer end of said journal and an end wall at said one end overlying the upper portion of the flanged end of said journal, a top half bushing of semicylindrical shape disposed in said top member in closing relationship to said lubricant reservoir chamber and bearing on the top portion of said journal, and a bottom half bushing having an inner surface of substantially semicylindrical shape receiving the lower portion of said journal and having in one end a groove of semicircular shape receiving the lower portion of said journal flange and at said one end an end wall covering the lower portion of the outer end of said journal, said bottom half bushing being detachably secured along its side edges to the corresponding side edges of said top member and said top half bushing having at least one lubricant groove in the outer surface thereof and having its side edges spaced from the corresponding side edges of said bottom half bushing to provide lubricant passages placing the ends of said groove in communication with the interior of said bearing.

3. In combination with a railway car axle journal having an annular external flange on its outer end, a split bearing assembly comprising a top member having a semicylindrical inner surface extending substantially halfway around said journal and having at one end an end wall overlying substantially one half of the flanged end of said journal and a semicircular recess adjacent said end wall receiving substantially one half of said journal flange, a top half bushing of substantially semicylindrical shape disposed in said top member and extending around the adjacent portion of said journal to provide a bearing for said journal, and a bottom half bushing extending around the remainder of said journal and detachably connected along its side edges to the side edges of said top member, said bottom half bushing having at one end an end wall overlying the portion of the flanged end of said journal not covered by said top member end wall and a semicircular recess adjacent the end wall thereof receiving the corresponding portion of said journal flange, said top member having a lubricant reservoir chamber therein and said top half bushing having lubricant channels extending from said lubricant reservoir past the side edges thereof for conducting lubricant from said reservoir chamber to the bearing surface of said journal.

References Cited in the file of this patent

UNITED STATES PATENTS

| Number | Name | Date |
|---|---|---|
| 262,025 | England | Aug. 1, 1882 |
| 1,017,295 | Kroerner | Feb. 13, 1912 |
| 1,336,373 | Newbigin | Apr. 6, 1920 |
| 2,670,998 | Barber | Mar. 2, 1954 |